(12) United States Patent
Harris et al.

(10) Patent No.: US 11,143,289 B2
(45) Date of Patent: Oct. 12, 2021

(54) ROTARY SHIFTER WITH SECONDARY ROTARY KNOB

(71) Applicant: GHSP, Inc., Grand Haven, MI (US)

(72) Inventors: Richard W. Harris, Kentwood, MI (US); Glenn M. Clapp, Holland, MI (US); Josiah Bonewell, Grand Rapids, MI (US)

(73) Assignee: GHSP, Inc., Grand Haven, MI (US)

( * ) Notice: Subject to any disclaimer, the term of this patent is extended or adjusted under 35 U.S.C. 154(b) by 155 days.

(21) Appl. No.: 16/443,366

(22) Filed: Jun. 17, 2019

(65) Prior Publication Data
US 2019/0383386 A1 Dec. 19, 2019

Related U.S. Application Data

(60) Provisional application No. 62/685,408, filed on Jun. 15, 2018.

(51) Int. Cl.
| | | |
|---|---|---|
| *F16H 59/08* | (2006.01) | |
| *F16H 63/42* | (2006.01) | |
| *G05G 1/02* | (2006.01) | |
| *G05G 13/00* | (2006.01) | |
| *G05G 1/08* | (2006.01) | |

(52) U.S. Cl.
CPC ............. *F16H 59/08* (2013.01); *F16H 63/42* (2013.01); *G05G 1/02* (2013.01); *G05G 1/08* (2013.01); *G05G 13/00* (2013.01); *F16H 2059/081* (2013.01); *F16H 2063/423* (2013.01)

(58) Field of Classification Search
CPC .... F16H 59/08; F16H 63/42; F16H 2059/081; F16H 2063/423; G05G 1/02; G05G 1/08; G05G 13/00
See application file for complete search history.

(56) References Cited

U.S. PATENT DOCUMENTS

| | | | | |
|---|---|---|---|---|
| 3,901,097 A | * | 8/1975 | Williams | ............... F16H 59/08 74/473.3 |
| 6,564,661 B2 | | 5/2003 | DeJonge | |
| 6,612,194 B2 | | 9/2003 | DeJonge | |
| 8,264,338 B2 | * | 9/2012 | Leon | ...................... F16H 59/12 340/456 |
| 9,334,949 B2 | | 5/2016 | Fett et al. | |
| 9,845,868 B2 | * | 12/2017 | Lee | .......................... G05G 1/08 |

(Continued)

FOREIGN PATENT DOCUMENTS

| | | |
|---|---|---|
| CN | 203604615 | 5/2014 |
| EP | 2034383 | 3/2009 |

(Continued)

*Primary Examiner* — David M Fenstermacher
(74) *Attorney, Agent, or Firm* — Price Heneveld LLP

(57) ABSTRACT

A vehicle shifter is provided for selecting gears of a vehicle transmission. The vehicle shifter including: a base configured for mounting to a center floor console of a vehicle; a first rotary knob positioned on the base and rotatable about an axis; and a second rotary knob positioned on the base and below the first rotary knob and rotatable about the same axis as the first rotary knob, wherein rotation of one of the first rotary knob and the second rotary knob causes selection of the gears of the vehicle transmission, and rotation of the other one of the first rotary knob and the second rotary knob provides input for a secondary function.

20 Claims, 4 Drawing Sheets

(56) References Cited

U.S. PATENT DOCUMENTS

| | | | |
|---|---|---|---|
| 10,187,058 B2 * | 1/2019 | Simao | H03K 17/9517 |
| 10,677,344 B2 * | 6/2020 | Wang | F16H 61/24 |
| 10,788,123 B2 * | 9/2020 | Wang | F16H 61/24 |
| 10,804,054 B1 * | 10/2020 | Chu | G05G 5/03 |
| 10,865,875 B2 * | 12/2020 | Kim | F16H 59/08 |
| 10,871,221 B2 * | 12/2020 | Botella | F16H 59/08 |
| 10,890,251 B2 * | 1/2021 | Beattie | F16H 61/24 |
| 2015/0251534 A1 | 9/2015 | Kim | |
| 2016/0017983 A1 | 1/2016 | Levesque et al. | |
| 2017/0074391 A1 | 3/2017 | Tebbe | |

FOREIGN PATENT DOCUMENTS

| | | |
|---|---|---|
| KR | 20160007114 A | 1/2016 |
| SU | 258797 | 4/1970 |
| WO | 2018217865 A1 | 11/2018 |

\* cited by examiner

ROTARY SHIFTER WITH SECONDARY ROTARY KNOB

CROSS-REFERENCE TO RELATED APPLICATION

This application claims priority to and the benefit under 35 U.S.C. § 119(e) of U.S. Provisional Patent Application No. 62/685,408, filed on Jun. 15, 2018, entitled "ROTARY SHIFTER WITH SECONDARY ROTARY KNOB," by Richard W. Harris et al., the entire disclosure of which is incorporated herein by reference.

FIELD OF THE INVENTION

The embodiments described below generally pertain to a vehicle shifter and more particularly relate to a rotary shifter.

SUMMARY OF THE INVENTION

According to one aspect of the present invention, a vehicle shifter is provided for selecting gears of a vehicle transmission. The vehicle shifter comprises: a base configured for mounting to a center floor console of a vehicle; a first rotary knob positioned on the base and rotatable about an axis; and a second rotary knob positioned on the base and below the first rotary knob and rotatable about the same axis as the first rotary knob, wherein rotation of one of the first rotary knob and the second rotary knob causes selection of the gears of the vehicle transmission and rotation of the other one of the first rotary knob and the second rotary knob provides input for a secondary function.

According to another aspect of the present invention, a vehicle shifter is provided for selecting gears of a vehicle transmission. The vehicle shifter comprises: a base configured for mounting to a center floor console of a vehicle; a first rotary knob positioned on the base and rotatable about an axis; and a second rotary knob positioned on the base and below the first rotary knob and rotatable about the same axis as the first rotary knob, wherein rotation of the first rotary knob causes selection of the gears of the vehicle transmission and rotation of the second rotary knob provides input for a secondary function, wherein the secondary function is one of a drive train control and an infotainment system control.

According to another aspect of the present invention, a vehicle shifter is provided for selecting gears of a vehicle transmission. The vehicle shifter comprises: a base configured for mounting to a center floor console of a vehicle; a first rotary knob positioned on the base and rotatable about an axis; and a second rotary knob positioned on the base and below the first rotary knob and rotatable about the same axis as the first rotary knob, wherein rotation of the first rotary knob causes selection of the gears of the vehicle transmission and rotation of the second rotary knob provides input for a secondary function, wherein the second rotary knob functions as a scrolling wheel for scrolling through a list of possible selections on a display screen of an infotainment system when rotated, and wherein the second rotary knob is configured to be depressed to select one of the possible selections.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1:
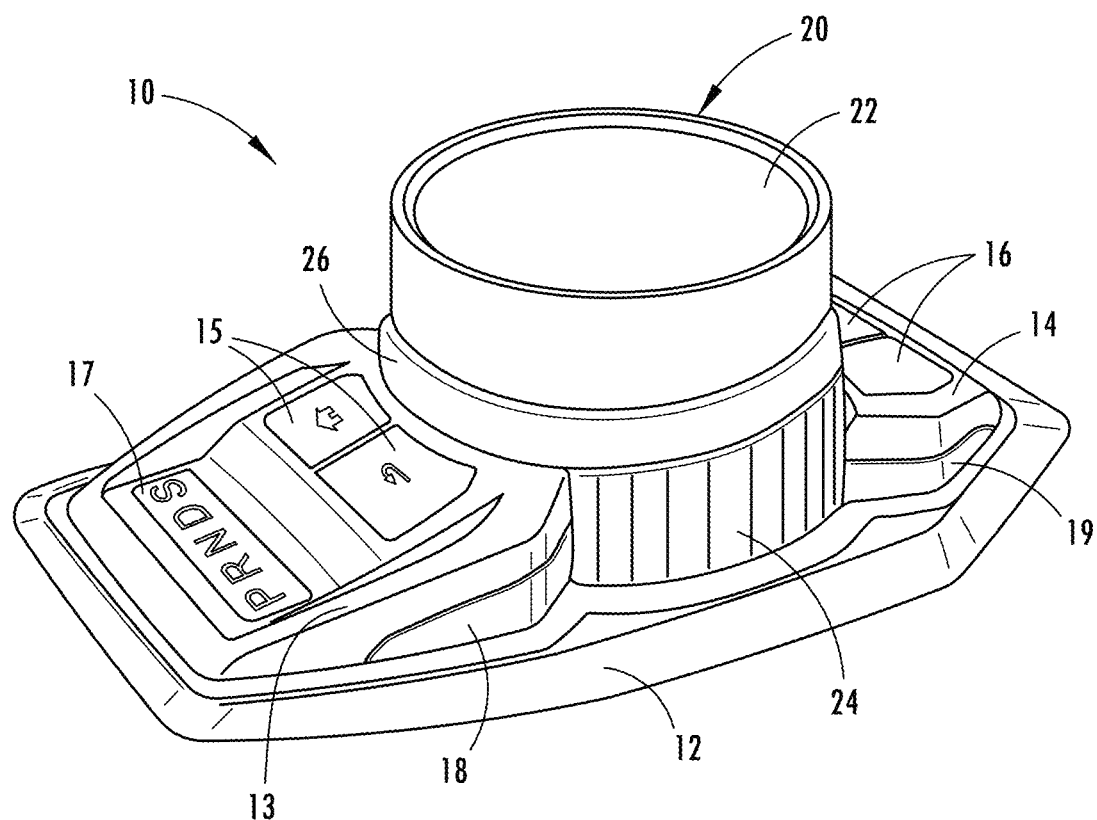
FIG. 1 is a perspective view of a vehicle shifter according to a first embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
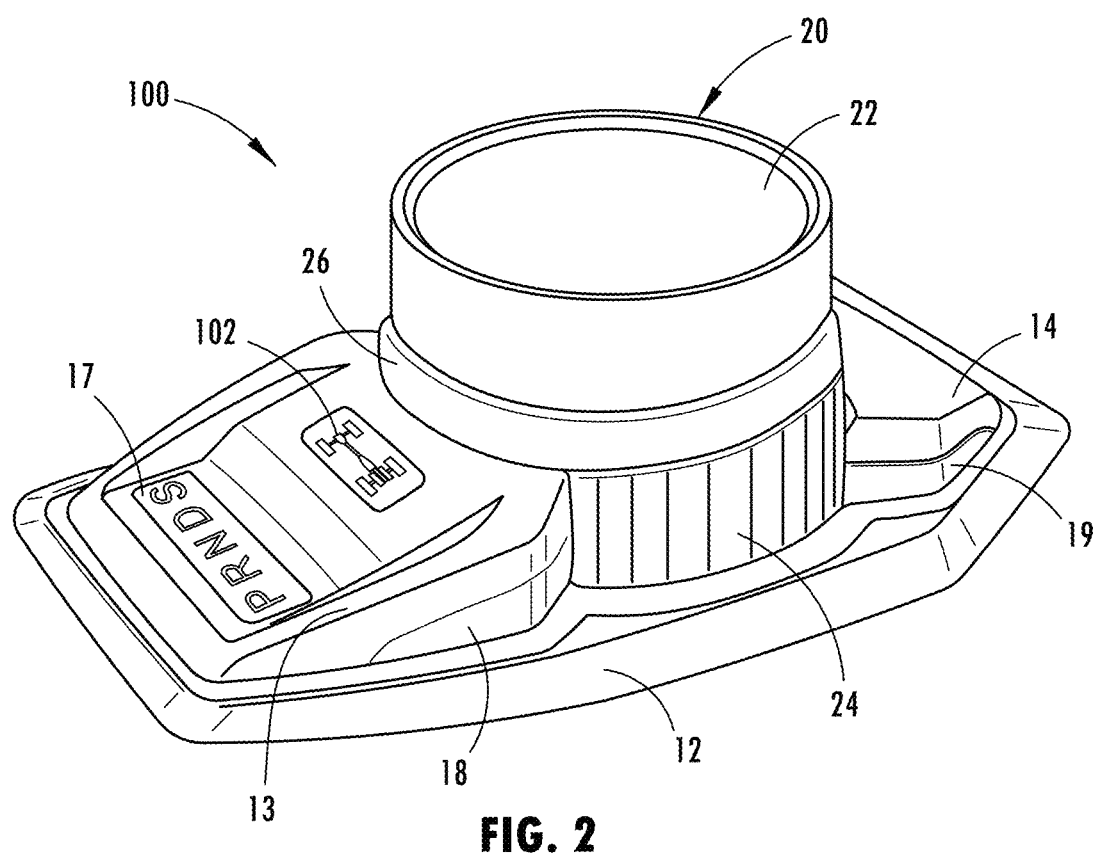
FIG. 2 is a perspective view of a vehicle shifter according to a second embodiment.

FIG. 1 shows a first embodiment of a shifter 10 for selecting gears of a vehicle transmission. FIG. 2 shows a second embodiment of a shifter 100. With respect to both embodiments, the shifter 10/100 includes a base 12 configured for mounting to a center floor console of a vehicle, a first rotary knob 22 positioned on the base 12 and rotatable about an axis, and a second rotary knob 24 positioned on the base 12 and below the first rotary knob 22 and rotatable about the same axis as the first rotary knob 22. Rotation of one of the first rotary knob 22 and the second rotary knob 24 causes selection of the gears of the vehicle transmission (not shown), and rotation of the other one of the first rotary knob 22 and the second rotary knob 24 provides input for a secondary function. Such a secondary function may be control for an infotainment system of the vehicle or drivetrain selection.

Figure 3:
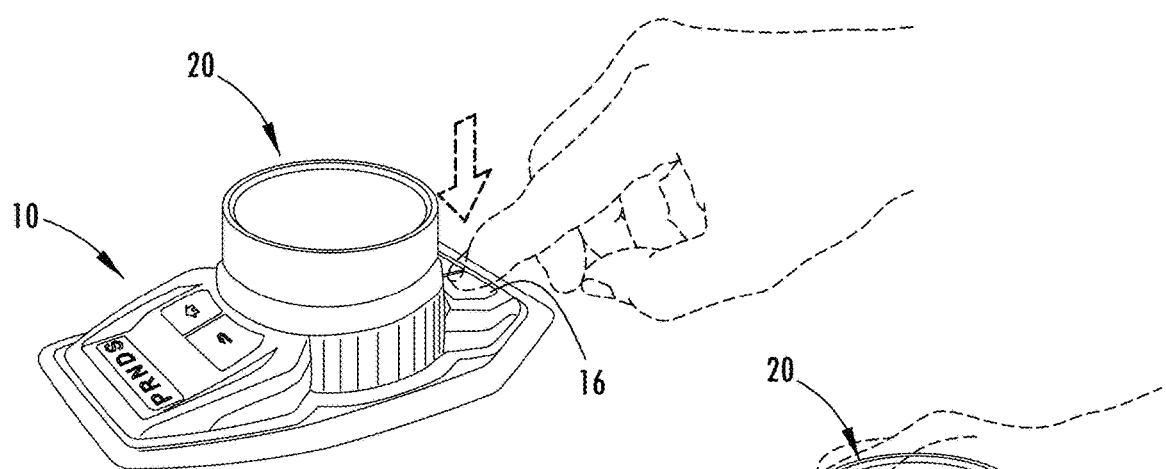
FIG. 3 is a perspective view of actuation of a button of the vehicle shifter of FIG. 1.
Figure 4:
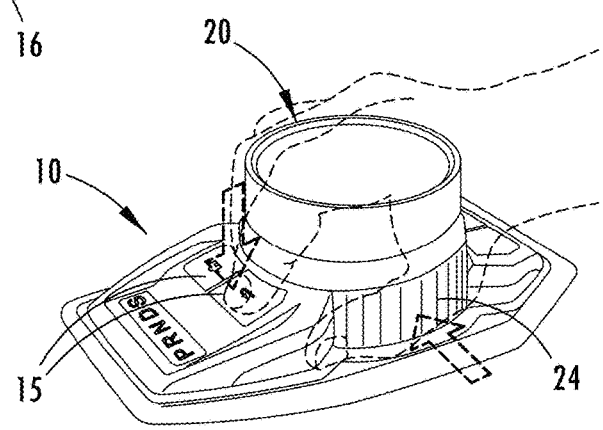
FIG. 4 is a perspective view of actuation of a button and depression of a second rotary knob of the vehicle shifter of FIG. 1.
Figure 5:
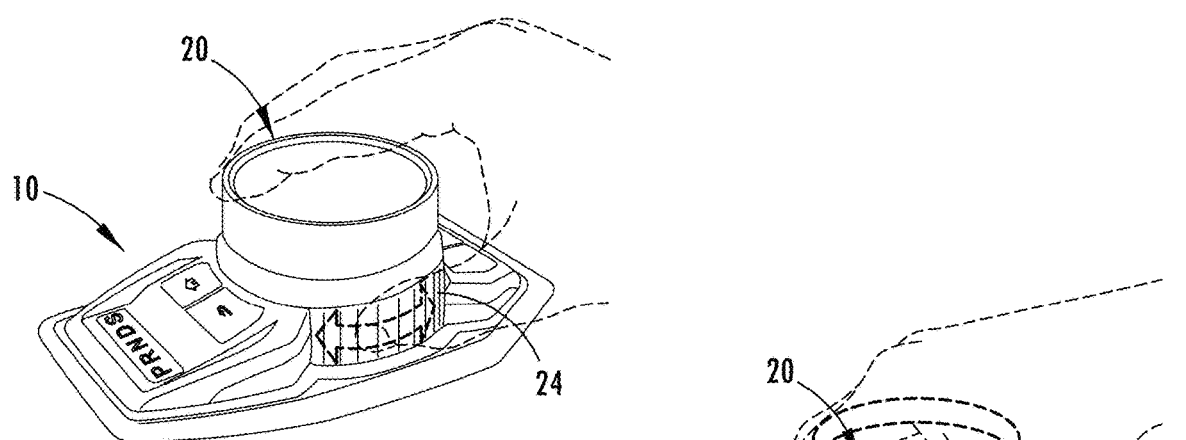
FIG. 5 is a perspective view of rotation of the second rotary knob of the vehicle shifter of FIG. 1.

The base 12 may include a forward face 13 that is inclined and faces generally upward and a rearward face 14 that is also inclined and faces generally upward. A first pair of input buttons 15 may be provided on forward face 13 along with a gear selection display 17. A second pair of input buttons 16 may optionally be provided on rearward face 14. The first pair of input buttons 15 and optionally the second pair of input buttons 16 may be provided for control of a menu for an infotainment system and/or navigation system of the vehicle by depressing one of these buttons as shown in FIGS. 3 and 4. In this case, the second rotary knob 24 may function as a scrolling wheel for scrolling through a list of possible selections on a display screen (not shown) of the infotainment system when rotated as shown in FIG. 5. As described further below, the secondary knob 24 may be depressed as shown in FIG. 4 to select one of the possible selections.

As shown in FIG. 2, the shifter 100 may include a drivetrain selection display 102 to graphically illustrate the drive train selection (i.e., two-wheel drive, four-wheel drive, all-wheel drive, etc.).

Figure 6:
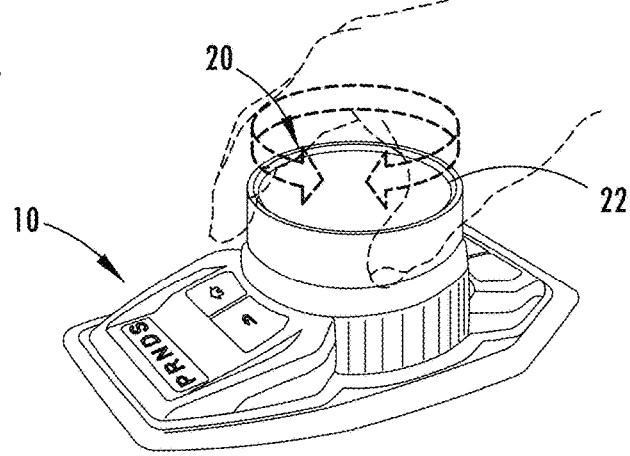
FIG. 6 is a perspective view of rotation of a first rotary knob of the vehicle shifter of FIG. 1.
Figure 7:
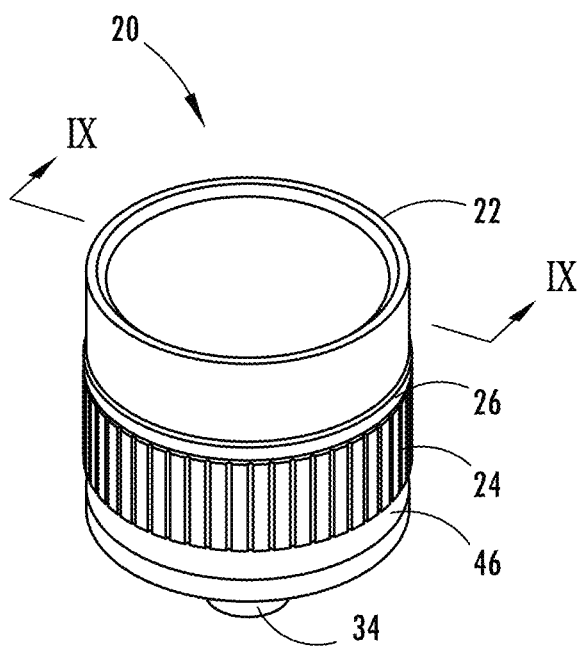
FIG. 7 is a perspective view of a knob subassembly for use in the vehicle shifters of FIGS. 1 and 2.
Figure 8:
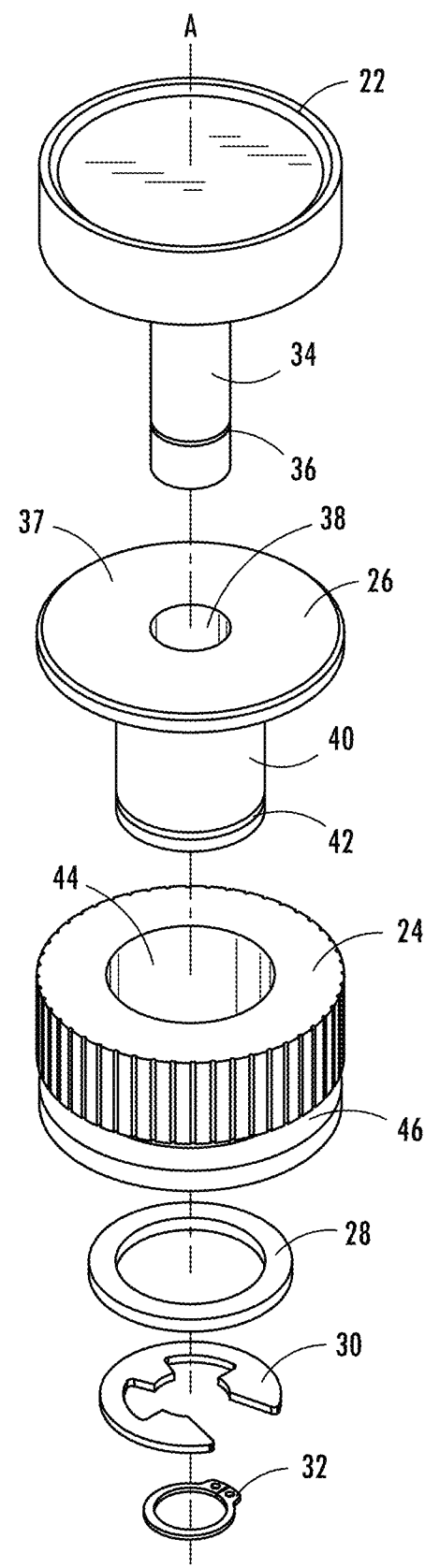
FIG. 8 is an exploded perspective view of the knob subassembly shown in FIG. 7.
Figure 9:
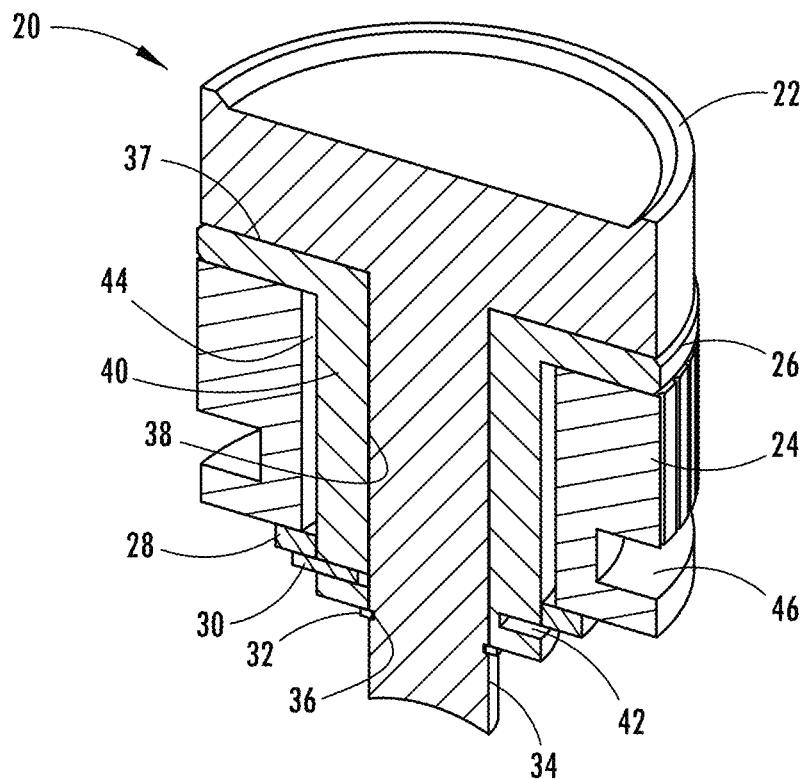
FIG. 9 is a first cross-sectional view of the knob subassembly shown in FIG. 7 taken along line IX-IX.
Figure 10:
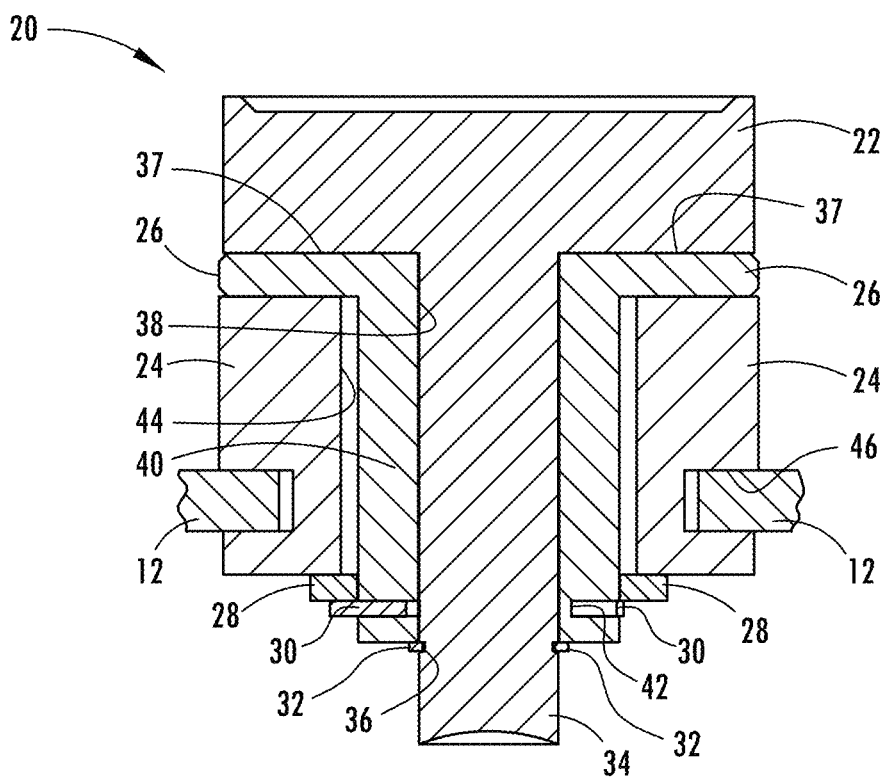
FIG. 10 is a second cross-sectional view of the knob subassembly shown in FIG. 7 taken along line IX-IX.

The first rotary knob 22 may be rotated as shown in FIG. 6 to select a gear. The gear that is selected may be highlighted in the gear selection display 17.

The base 12 may further include accent features 18 and 19, which may be chrome or a translucent material that is backlit to provide an illuminated accent.

The construction of a knob subassembly 20, which includes first rotary knob 22 and second rotary knob 24, is shown in FIGS. 7-10. The first rotary knob 22 includes a cylindrical shaft 34 that extends downward along a central axis A. A groove 36 is provided at the lower end of the cylindrical shaft 34.

The knob subassembly 20 further includes a spacer 26 having a disk-shaped upper end 37 and a hub 40 that extend downward therefrom. The hub 40 has a cylindrical shape with an annular groove formed at the lower end thereof. A central aperture 38 is provided through the disk-shaped upper end 37 and the hub 40 for receiving the cylindrical shaft 34 of the first rotary knob 22. The spacer 26 thus supports the first rotary knob such that the knob 22 may be rotated relative to the spacer 26.

The second rotary knob 24 includes a central aperture 44 sized to receive the hub 40 of the spacer 26 such that the second rotary knob 24 may be rotated around the hub 40. The second rotary knob 24 may also include a groove 46 at the lower end thereof for receiving portions of the base 12.

The knob subassembly 20 may further include a washer 28 that fits around the lower end of the hub 40. The washer supports the lower end of the second rotary knob 24 and is held in place by a retaining clip 30 that snaps in place within the groove 42 on the lower end of the hub 40. A retaining ring 32 is provided to be secured in the groove 36 in the shaft 34 of the first rotary knob 22.

Using the construction shown in FIGS. 7-10, the both first rotary knob 22 and the second rotary knob 24 may be rotated about the same central axis A. By providing some space between the inner surface of the aperture 44 of the second rotary knob and the outer surface of the hub 40 of the spacer 26, the second rotary knob 24 may be depressed radially inward from at least one direction as shown in FIG. 4. Further, the opening in the base 12 that engages groove 46 may be slightly oblong to provide the ability of the second rotary knob 24 to move side to side but not front to back. Alternatively, the opening in base 12 may be circular and the groove 46 may be oblong rather than circular.

Although the first rotary knob 22 has been disclosed above as being used for gear selection, the second rotary knob 24 could be used for gear selection instead, and the first rotary knob 22 could provide for the secondary function.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the preferred embodiments only.

Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A vehicle shifter for selecting gears of a vehicle transmission, the vehicle shifter comprising:
   a base configured for mounting to a center floor console of a vehicle, the base comprising:
     a forward face, and
     a first pair of input buttons provided on the forward face;
   a first rotary knob positioned on the base and rotatable about an axis; and
   a second rotary knob positioned on the base and below the first rotary knob and rotatable about the same axis as the first rotary knob, wherein rotation of one of the first rotary knob and the second rotary knob causes selection of the gears of the vehicle transmission, and rotation of the other one of the first rotary knob and the second rotary knob provides input for a secondary function.

2. The vehicle shifter of claim 1, wherein the base further comprises:
a gear selection display provided on the forward face.

3. The vehicle shifter of claim 1, wherein the base comprises:
a drivetrain selection display provided on the forward face.

4. The vehicle shifter of claim 1, wherein the second rotary knob functions as a scrolling wheel for scrolling through a list of possible selections on a display screen of an infotainment system when rotated.

5. The vehicle shifter of claim 4, wherein the second rotary knob is configured to be depressed to select one of the possible selections.

6. A vehicle shifter for selecting gears of a vehicle transmission, the vehicle shifter comprising:
a base configured for mounting to a center floor console of a vehicle, wherein the base comprises:
a rearward face, and
a pair of input buttons provided on the rearward face;
a first rotary knob positioned on the base and rotatable about an axis; and
a second rotary knob positioned on the base and below the first rotary knob and rotatable about the same axis as the first rotary knob,
wherein rotation of one of the first rotary knob and the second rotary knob causes selection of the gears of the vehicle transmission, and rotation of the other one of the first rotary knob and the second rotary knob provides input for a secondary function.

7. A vehicle shifter for selecting gears of a vehicle transmission, the vehicle shifter comprising:
a base configured for mounting to a center floor console of a vehicle;
a first rotary knob positioned on the base and rotatable about an axis; and
a second rotary knob positioned on the base and below the first rotary knob and rotatable about the same axis as the first rotary knob,
wherein rotation of one of the first rotary knob and the second rotary knob causes selection of the gears of the vehicle transmission, and rotation of the other one of the first rotary knob and the second rotary knob provides input for a secondary function, wherein the secondary function is an infotainment system control.

8. The vehicle shifter of claim 7, wherein the base comprises:
a forward face; and
a first pair of input buttons provided on the forward face.

9. The vehicle shifter of claim 7, wherein the base comprises:
a forward face; and
a gear selection display provided on the forward face.

10. A vehicle shifter for selecting gears of a vehicle transmission, the vehicle shifter comprising:
a base configured for mounting to a center floor console of a vehicle;
a first rotary knob positioned on the base and rotatable about an axis; and
a second rotary knob positioned on the base and below the first rotary knob and rotatable about the same axis as the first rotary knob,
wherein rotation of the first rotary knob causes selection of the gears of the vehicle transmission, and rotation of the second rotary knob provides input for a secondary function, wherein the secondary function is an infotainment system control.

11. The vehicle shifter of claim 10, wherein the base comprises:
a forward face; and
a gear selection display provided on the forward face.

12. The vehicle shifter of claim 11, wherein the base further comprises:
a first pair of input buttons provided on the forward face.

13. The vehicle shifter of claim 11, wherein the base further comprises:
a drivetrain selection display provided on the forward face.

14. The vehicle shifter of claim 12, wherein the base comprises:
a rearward face; and
a second pair of input buttons provided on the rearward face.

15. The vehicle shifter of claim 10, wherein the second rotary knob functions as a scrolling wheel for scrolling through a list of possible selections on a display screen of an infotainment system when rotated.

16. The vehicle shifter of claim 15, wherein the second rotary knob is configured to be depressed to select one of the possible selections.

17. A vehicle shifter for selecting gears of a vehicle transmission, the vehicle shifter comprising:
a base configured for mounting to a center floor console of a vehicle;
a first rotary knob positioned on the base and rotatable about an axis; and
a second rotary knob positioned on the base and below the first rotary knob and rotatable about the same axis as the first rotary knob,
wherein rotation of the first rotary knob causes selection of the gears of the vehicle transmission and rotation of the second rotary knob provides input for a secondary function, wherein the second rotary knob functions as a scrolling wheel for scrolling through a list of possible selections on a display screen of an infotainment system when rotated, and wherein the second rotary knob is configured to be depressed to select one of the possible selections.

18. The vehicle shifter of claim 17, wherein the first rotary knob includes a cylindrical shaft that extends downward along the axis, the vehicle shifter further comprising a spacer having a disk-shaped upper end and a hub that extends downward from the disk-shaped upper end, the hub having a cylindrical shape, a central aperture is provided through the disk-shaped upper end and the hub for receiving the cylindrical shaft of the first rotary knob to thereby support the first rotary knob such that the first rotary knob may be rotated relative to the spacer.

19. The vehicle shifter of claim 18, wherein the second rotary knob includes a central aperture sized to receive the hub of the spacer such that the second rotary knob may be rotated around the hub.

20. The vehicle shifter of claim 19, wherein space is provided between an inner surface of the central aperture of the second rotary knob and an outer surface of the hub of the spacer such that the second rotary knob may be depressed radially inward from at least one direction.

* * * * *